United States Patent
Lee et al.

(10) Patent No.: US 10,581,045 B2
(45) Date of Patent: Mar. 3, 2020

(54) SEPARATOR FOR ELECTROCHEMICAL ELEMENT HAVING IMPROVED ELECTROLYTE WETTABILITY AND ELECTROCHEMICAL ELEMENT COMPRISING SAME SEPARATOR

(71) Applicant: LG Chem, Ltd., Seoul (KR)

(72) Inventors: Joo-Sung Lee, Daejeon (KR); Sun-Mi Jin, Daejeon (KR)

(73) Assignee: LG Chem, Ltd. (KR)

( * ) Notice: Subject to any disclaimer, the term of this patent is extended or adjusted under 35 U.S.C. 154(b) by 209 days.

(21) Appl. No.: 15/548,185

(22) PCT Filed: Apr. 29, 2016

(86) PCT No.: PCT/KR2016/004522
§ 371 (c)(1),
(2) Date: Aug. 2, 2017

(87) PCT Pub. No.: WO2016/175605
PCT Pub. Date: Nov. 3, 2016

(65) Prior Publication Data
US 2018/0034025 A1 Feb. 1, 2018

(30) Foreign Application Priority Data

Apr. 30, 2015 (KR) .................. 10-2015-0061979
Apr. 28, 2016 (KR) .................. 10-2016-0052382

(51) Int. Cl.
*H01M 2/16* (2006.01)
*H01M 2/14* (2006.01)
*H01M 10/0525* (2010.01)

(52) U.S. Cl.
CPC ............ *H01M 2/16* (2013.01); *H01M 2/145* (2013.01); *H01M 2/166* (2013.01); *H01M 2/1653* (2013.01); *H01M 2/1686* (2013.01); *H01M 10/0525* (2013.01)

(58) Field of Classification Search
CPC ....... H01M 2/16; H01M 2/1653; H01M 2/166
See application file for complete search history.

(56) References Cited

U.S. PATENT DOCUMENTS

| 2011/0259505 A1 | 10/2011 | Lee et al. |
| 2013/0323569 A1 | 12/2013 | Yeou et al. |
| 2014/0377630 A1 | 12/2014 | Kawakami et al. |
| 2015/0111109 A1 | 4/2015 | Yamada et al. |

FOREIGN PATENT DOCUMENTS

| KR | 20110035847 A | | 4/2011 |
| KR | 20140016715 A | | 2/2014 |
| KR | 20140016715 | * | 10/2014 |
| KR | 20140148320 A | | 12/2014 |
| KR | 20150025825 A | | 3/2015 |
| KR | 20150034825 A | | 4/2015 |
| KR | 20150035504 A | | 4/2015 |

OTHER PUBLICATIONS

Search report from International Application No. PCT/KR2016/004522, dated Aug. 25, 2016.

* cited by examiner

Primary Examiner — Ula C Ruddock
Assistant Examiner — Thomas H. Parsons
(74) Attorney, Agent, or Firm — Lerner, David, Littenberg, Krumholz & Mentlik, LLP

(57) ABSTRACT

The present invention relates to a separator for an electrochemical element having improved electrolyte wettability and an electrochemical element comprising the separator, in which a layer containing at least two binder polymers having different slopes on the frequency-storage modulus curve is formed on a surface of the separator, and with one of the binder polymers being concentratedly distributed on the surface of the separator, the separator and the electrode can be securely attached, and with the other binder polymer being permeated and coated onto a porous polymer substrate, electrolyte wettability can be enhanced.

12 Claims, No Drawings

SEPARATOR FOR ELECTROCHEMICAL ELEMENT HAVING IMPROVED ELECTROLYTE WETTABILITY AND ELECTROCHEMICAL ELEMENT COMPRISING SAME SEPARATOR

CROSS-REFERENCE TO RELATED APPLICATION

The present application is a national phase entry under 35 U.S.C. § 371 of International Application No. PCT/KR2016/004522 filed Apr. 29, 2016, which claims priority from Korean Patent Application No. 10-2015-0061979 filed on Apr. 30, 2015 and Korean Patent Application No. 10-2016-0052382 filed on Apr. 28, 2016, all of which are incorporated herein by reference.

TECHNICAL FIELD

The present disclosure relates to a separator for an electrochemical element having improved electrolyte wettability and an electrochemical element including the separator.

BACKGROUND ART

Recently, energy storage technologies are receiving increasing attentions. As application areas expand to energies for mobile phones, camcorders and notebook PCs and further to electric vehicles, more systematic efforts are made for the researches and developments of electrochemical elements. Electrochemical element is gathering the most attention in this aspect, and especially, development of chargeable and dischargeable secondary batteries is becoming the focus of interest.

Diligent researches and studies gave rise to development of the electrochemical elements as the electrode active materials that have various significantly improved functions, such as the electrochemical element with improved output. Among the currently-available secondary batteries, lithium secondary battery developed in the early 1990s is coming into spotlight because of advantages such as higher operating voltages and superior energy density compared to conventional batteries such as Ni—MH, and the like.

Many companies are producing the electrochemical elements described above, but these have respectively varying safety aspects. For such electrochemical elements, evaluating and ensuring safety is of great importance. One of the most important issue to consider is that a user should not be injured in the event of malfunction of the electrochemical element, and for this purpose, safety rules are imposed for strictly regulating the ignition and fuming in the electrochemical element.

A separator of the electrochemical element plays an important role of passing electrolyte or ions while isolating a cathode and an anode to thus prevent shorts of the two electrodes, and it is thus required that the separator have various characteristics in view of electrical, chemical, and mechanical considerations.

For example, the separator has to be securely attached to the electrodes, and at the same time, has to have a reduced thickness for lightness and compactness of the electrochemical element without compromising a sufficient mechanical strength thereof.

Such separator can be formed by incorporating polyolefin-based porous polymer substrate, but this porous polymer substrate has a problem of insufficient electrolyte wettability. This problem is still experienced even when a porous coating layer containing a mixture of an inorganic particle and a binder polymer is formed on at least one surface of the porous polymer substrate, because while the porous coating layer may enhance electrolyte wettability, the electrolyte wettability of the porous polymer substrate is not enhanced.

Meanwhile, a method also has been suggested that the binder polymer is distributed with a gradient of concentration along a thickness direction of the separator, in which the binder polymer is phase-separated under a certain humidity condition so that more binder polymer is distributed on a surface of the separator where the electrode is adhered. However, while the above method may enhance adhesion between the separator and the electrode, it is difficult to expect an increase in electrolyte wettability of the porous polymer substrate.

DISCLOSURE

Technical Problem

The present disclosure is directed to providing a separator having improved electrolyte wettability of a porous polymer substrate, and also exhibiting strong adhesion to the electrodes.

Further, the present disclosure is directed to providing an electrochemical element fabricated by incorporating said separator, thus having shortened activation time and improved battery lifetime.

Technical Solution

In one aspect of the present disclosure, there is provided a separator for an electrochemical element, which may include a porous polymer substrate having a plurality of pores, and a layer formed from a binder polymer solution containing a first binder polymer and a second binder polymer and formed on at least one surface of the porous polymer substrate, in which, based on a frequency-storage modulus curve having a horizontal axis representing a frequency (rad/s) converted into a log scale and a vertical axis representing a storage modulus (MPa) converted into a log scale, within a range of 0.01 rad/s to 10 rad/s frequency, a slope of the frequency-storage modulus curve is greater than 0 and no more than 1.0 when the first binder polymer is added at a concentration of 3 wt % to a solvent where methanol is further added at a concentration of 30 wt %, and the slope of the frequency-storage modulus curve is greater than 1.0 and no more than 2.0 when the second binder polymer is added at a concentration of 3 wt % to the solvent where methanol is further added at a concentration of 30 wt %.

The first binder polymer and the second binder polymer may be used in a weight ratio of 20:1 to 2:1.

The layer comprising the first binder polymer and the second binder polymer may further include inorganic particles.

The inorganic particles may include inorganic particles having a dielectric constant of about 5 or higher, inorganic particles having a lithium ion transfer ability, or a mixture thereof.

The inorganic particles having the dielectric constant of about 5 or higher may be any one selected from a group consisting of boehmite, $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)PB(Mg_{1/3}Nb_{2/3})O_3-xPbTiO_3$ (PMN-PT, $0<x<1$), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$ and SiC, or a mixture of two or more thereof.

The inorganic particle having a lithium ion transfer ability are any one selected from the group consisting of lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$-based glass (0<x<4, 0<y<13), lithium lanthan titanate (Li$_x$La$_y$TiO$_3$, 0<x<2, 0<y<3), lithium germanium thio phosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$-based glass (Li$_x$Si$_y$S$_z$, 0<x<3, 0<y<2, 0<z<4) and P$_2$S$_5$-based glass (Li$_x$P$_y$S$_z$, 0<x<3, 0<y<3, 0<z<7) or a mixture of two or more thereof.

In another aspect of the present disclosure, there is also provided a method for manufacturing a separator for an electrochemical element, wherein the method may include preparing a porous polymer substrate having a plurality of pores (S1), preparing a binder polymer solution containing a first binder polymer, a second binder polymer, a solvent to dissolve both of the binder polymers, and a non-solvent to dissolve none of the binder polymers (S2); and coating the binder polymer solution on at least one surface of the porous polymer substrate, and phase-separating under a humidity condition (S3).

The solvent may be any one selected from a group consisting of acetone, dimethyl acetamide (DMAc), dimethylformamide (DMF), tetrahydrofuran, methylene chloride (MC), chloroform, N-methyl-2-pyrrolidone (NMP) and cyclohexane, or a mixture of two or more thereof.

The non-solvent may be any one selected from a group consisting of methanol, ethanol, isopropyl alcohol, butanol, ethyl acetate and water, or a mixture of two or more thereof.

A weight ratio between the solvent and the non-solvent may be 98:2 to 50:50.

The humidity condition may be a relative humidity condition of 40% to 80% at a temperature of 25° C. to 80° C.

Advantageous Effects

A separator fabricated according to one aspect of the present disclosure is securely adhered to an electrode due to a binder polymer distributed on a surface thereof, and also enhances electrolyte wettability of a porous polymer substrate due to the binder polymer permeated and coated onto the porous polymer substrate.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A separator according to an aspect of the present disclosure includes a porous polymer substrate having a plurality of pores, and a layer formed from a binder polymer solution including a first binder polymer and a second binder polymer and formed on at least one surface of the porous polymer substrate, in which, based on a frequency-storage modulus curve having a horizontal axis representing a frequency (rad/s) converted into a log scale and a vertical axis representing a storage modulus (MPa) converted into a log scale, within a range of 0.01 rad/s to 10 rad/s frequency, a slope of the frequency-storage modulus curve is greater than 0 and no more than 1.0 when the first binder polymer is added at a concentration of 3 wt % to a solvent where methanol is further added at a concentration of 30 wt %, and the slope of the frequency-storage modulus curve is greater than 1.0 and no more than 2.0 when the second binder polymer is added at a concentration of 3 wt % to the solvent where methanol is further added at a concentration of 30 wt %.

'Methanol' is used herein as a non-solvent for the binder polymer, and the numerical value for a storage modulus of the binder polymer can be completely different depending on type and content of the non-solvent.

Further, 'solution' used herein is a solvent for the binder polymer.

'Storage modulus' expresses a magnitude of elastic energy accumulated in a vibrating sample. A slope of the storage modulus of the ideal binder polymer solution is 2. However, a slope of the storage modulus shows a tendency of being decreased upon occurrence of the phase-separation with the non-solvent. Specifically, when methanol is further added to the solvent in a concentration of 30 wt %, the binder polymer solution with a slope of the storage modulus of no more than 1 is sensitive to the vapor-induced phase-separation and thus advantageous for the formation of an electrode adhesive layer, while the binder polymer solution with a slope of the storage modulus exceeding 1 is not sensitive to the vapor-induced phase-separation and thus continuously permeated into the porous coating layer or the pores of the porous polymer substrate during drying process, thus enhancing electrolyte wettability.

When a binder polymer solution containing the first binder polymer with solvent and non-solvent is prepared, based on the frequency-storage modulus curve having a horizontal axis representing a frequency (rad/s) of the binder polymer solution converted into a log scale and a vertical axis representing a storage modulus (Pa) of the binder polymer solution converted into a log scale, it is required that a slope of the frequency-storage modulus curve of the ideal binder polymer solution be greater than 0 and no more than 1.0 theoretically, since the first binder polymer solution is required to exhibit fast phase-separation behavior under a vapor-induced phase-separation condition.

Non-limiting examples of the first binder polymer may include polyvinylidene fluoride (PVDF), PVdF-HFP having 9% or lower HFP substitution ratio, PVDF copolymer having a low copolymer substitution degree, or a mixture thereof, but not limited thereto.

When a binder polymer solution containing the second binder polymer with solvent and non-solvent is prepared, based on the frequency-storage modulus curve having a horizontal axis representing a frequency (rad/s) of the binder polymer solution converted into a log scale and a vertical axis representing a storage modulus (Pa) of the binder polymer solution converted into a log scale, it is required that a slope of the frequency-storage modulus curve of the ideal binder polymer solution be greater than 1.0 and no more than 2.0 theoretically, since the second binder polymer is required to exhibit slow phase-separation behavior under a vapor-induced phase-separation condition.

Non-limiting examples of the second binder polymer may include PVdF-HFP having a HFP substitution ratio of no less than 12%, PVdF-CTFE, polynvinylacetate, cyanoethyl pullulan, cyanoethyl polyvinylalcohol, PVDF having a high copolymer substitution degree, and a mixture thereof, but not limited thereto.

One of methods for strengthening storage modulus is to strengthen the storage modulus by adding non-solvent.

The first binder polymer and the second binder polymer may be used in a weight ratio of 20:1 to 2:1. When the first binder polymer is used more than the upper limit described above, significant improvement of electrolyte wettability is not achieved, and when the first binder polymer is used less than the lower limit described above, phase-separation is made slowly, which deteriorates coating productivity, thus obtained separator has insufficient adhesion to the electrodes.

The solvent that can be used in the present disclosure may be any one selected from a group consisting of acetone, dimethyl acetamide (DMAc), dimethylformamide (DMF), tetrahydrofuran, methylene chloride (MC), chloroform, N-methyl-2-pyrrolidone (NMP) and cyclohexane, or a mixture of two or more thereof, but not limited thereto.

Because the solvent remaining in the finished electrochemical element may result in various side reactions depending on a type of the solvent, it may be necessary to remove the solvent in the fabrication process of the electrochemical element.

The non-solvent may be any one selected from a group consisting of methanol, ethanol, isopropyl alcohol, butanol, ethyl acetate and water, or a mixture of two or more thereof, but not limited thereto.

Depending on types of the solvent and the non-solvent, the mixing weight ratio may be 99:1 to 40:60 or 98:2 to 50:50. When the mixture satisfies the range of the mixing weight ratio described above, the binder polymer may be permeated into the porous polymer substrate and form the coating.

Meanwhile, the binder polymer solution according to the present disclosure may further include inorganic particles.

With respect to safety characteristics of the electrochemical element, there is high possibility that the electrochemical element is overheated and has thermal runway, or even exploded when the separator is penetrated. Specifically, because of the properties and the fabrication process including elongation of the polyolefin-based porous polymer substrate which is generally used as the separator of the electrochemical element, the polyolefin-based porous polymer substrate when used as a separator may exhibit extreme thermal contraction behavior at a temperature of 100° C. or higher, thus causing shorts between a cathode and an anode.

As a solution to such safety problem of the electrochemical element, a porous coating layer containing a mixture of binder polymer and inorganic particles may be formed on one surface or both surfaces of the porous polymer substrate. The inorganic particles serve as a kind of a spacer that supports physical structures of the porous coating layer, thus suppressing thermal contraction of the porous polymer substrate when the electrochemical element is overheated, while also preventing direct contact between the cathode and the anode even when the porous polymer substrate is damaged.

According to the present disclosure, such porous coating layer may be fabricated by coating a slurry containing solvent, non-solvent, binder polymer and inorganic particles on the porous polymer substrate with a dip coating method and drying the same.

In an example, any inorganic particle may be used in the present disclosure without being limited to a specific example, as long as the particle is electrochemically stable. That is, the inorganic particles can be used in the present disclosure without being specifically limited as long as oxidation and/or reduction does not occur at operating voltage range (e.g., 0 V to 5V based on Li/Li$^+$) of an electrochemical device in use. Specifically, when the inorganic particles having high dielectric constant are used, ion conductivity of electrolyte can be improved as the inorganic particles contribute to increased dissociation of electrolyte salt (e.g., lithium salt) within liquid electrolyte.

Because of the reasons mentioned above, the inorganic particles may include high dielectric constant inorganic particles having a dielectric constant of 5 or higher, or preferably, 10 or higher. Non-limiting examples of the inorganic particle having a dielectric constant of 5 or higher may be any one selected from a group consisting of boehmite, $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC and $TiO_2$, or a mixture of two or more thereof.

Further, the inorganic particles having lithium ion transfer ability, i.e., the inorganic particles containing lithium elements without storing lithium, and having a function of moving lithium ions may be used. Non-limiting examples of the inorganic particle having lithium ion transfer ability may include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O-9Al_2O_3-38TiO_2-39P_2O_5$ and so on, lithium lanthanum titanate ($Li_xLa_yTiO_3$, $0<x<2$, $0<y<3$), lithium germanium tiophosphate ($Li_xGe_yP_zS_w$, $0<x<4$, $0<y<1$, $0<z<1$, $0<w<5$) such as $Li_{3.25}Ge_{0.25}P_{0.75}S_4$ and so on, lithium nitrite ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4-Li_2S-SiS_2$ and so on, $P_2S_5$-based glass ($Li_xP_yS_z$, $0<x<3$, $0<y<3$, $0<z<7$) such as $LiI-Li_2S-P_2S_5$ and so on, or a mixture thereof.

The inorganic particle is are not limited to a certain size, but for proper porosity of the separator, may have an average particle size in a range of 0.001 µm to 10 µm.

A composition ratio of the inorganic particle and the binder polymer within the porous coating layer may from about 50:50 to about 99:1, or from about 60:40 to about 95:5. A thickness of the porous coating layer comprising the inorganic particle and the binder polymer may not be particularly limited, but may be in a range from about 0.01 µm to about 20 µm. Further, pore size and porosity are also not specifically limited, but the pore size may be in a range of from about 0.01 µm to about 5 µm and the porosity may be in a range from about 5% to about 75%.

In addition to the inorganic particle and the binder polymer described above as the components of the porous coating layer, other additives generally used in the art may also be included.

In the porous coating layer, the binder polymer attaches the inorganic particles with each other (i.e., the binder polymer connects and immobilizes the inorganic particles) such that the inorganic particles maintain the state of being bonded to one another. Further, the porous coating layer is maintained in a state of being bonded to the porous polymer substrate by the binder polymer. The interstitial volumes among the inorganic particles, which are spaces defined by the inorganic particles substantially in surface contact with each other in the closely packed or densely packed structure of the inorganic particles of the porous coating layer, become the pores of the porous coating layer.

Any porous polymer substrate that is generally used for the electrochemical element may be used, such as, for example, polyolefin-based porous membrane or nonwoven fabric, although not limited thereto.

Non-limiting examples of the polyolefin-based porous membrane may include a membrane formed from polyolefin-based polymer such as polyethylene such as high-density polyethylene, linear low-density polyethylene, low-density polyethylene, ultra high molecular weight polyethylene, polypropylene, polybutylene, polypentene and so on, either individually or from a polymer formed from a mixture thereof.

The non-woven fabric may include not only the polyolefin-based non-woven fabric described above, but also a non-woven fabric formed from a polymer including polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and so on, either individually or a mixture thereof. The structure of the non-woven fabric may be spun-bonded non-woven fabric or melt-blown non-woven fabric composed of long fibers.

A thickness of the porous polymer substrate may not be particularly limited, but may be 5 μm to 50 μm. Likewise, the pore size and porosity present in the porous polymer substrate may not be particularly limited, but may be 0.01 μm to 50 μm, and 10% to 95%, respectively.

A coating method generally used in the art may be used for coating the solution containing the binder polymer or the slurry containing the binder polymer and the inorganic particles on the porous polymer substrate. For example, various coating methods such as dip coating, die coating, roll coating, comma coating, or a combination thereof may be used. Further, the slurry may be coated on both surfaces, or selectively coated on one surface of the porous polymer substrate.

The coating process may be performed under a certain range relative humidity, and preferably performed under a relative humidity of 40% to 80% at a temperature of 25° C. to 80° C. When the temperature of the coating process is lower than the lower limit, drying of the porous coating layer is retarded, and when the temperature of the coating process is greater than the upper limit, time taken for phase-separation of the binder polymer may be insufficient. Further, when relative humidity of the coating process is lower than the lower limit, an amount of water which is a non-solvent, introduced during the vapor-induced phase-separation is too low to cause phase-separation to occur. When the relative humidity is higher than the upper limit, a problem of moisture condensing within a drying furnace is experienced.

Specifically, after coating the solution/slurry, the first binder polymer and the second binder polymer dissolved in the solution/slurry are subject to different phase-inversion due to vapor-induced phase-separation phenomenon as known in the art. The binder polymer that has a slope of the frequency-storage modulus curve greater than 1.0 and no more than 2.0 has a slower phase-separation velocity under same non-solvent, and needs a relatively greater amount of the non-solvent for the phase-separation. Further, after the coating, the binder polymer may be present throughout the thickness direction of the porous coating layer or permeated into the porous polymer substrate. Further, the binder polymer having a slope of the frequency-storage modulus curve greater than 0 and no more than 1.0 has a fast phase-separation velocity, requires a less amount of the non-solvent for the phase-separation, and is present concentratedly on the surface of the separator. Accordingly, in an aspect of the present disclosure, some of the binder polymer is concentratedly distributed on a surface of the separator, thus exhibiting excellent adhesion to the electrodes, while the other binder polymer is permeated into the porous polymer substrate and forms coating, such that the porous polymer substrate exhibits excellent electrolyte wettability.

The drying process implemented thereafter may be performed in a manner as known in the art, and may be performed successively or in a batch, using an oven or a heating chamber within a temperature range in consideration of the vapor pressure of the applied solvent. By the drying described above, the solvent present in the slurry is eliminated almost completely, and this preferably may be finished as fast as possible by considering productivity, and so on. For example, the drying may be performed for less than 1 min, or preferably, for less than 30 sec.

Meanwhile, the electrochemical element according to an aspect of the present disclosure includes a cathode, an anode, and a separator interposed between the cathode and the anode, in which the separator may be the separator as described above according to the present disclosure.

According to an aspect of the present disclosure, the electrochemical element includes all devices that perform electrochemical reactions, and may include, for example, all types of primary and secondary batteries, fuel cells, solar cells, or capacitors such as super capacitor elements, and so on. Specifically, a preferable example of the secondary batteries described above may be a lithium secondary battery including a lithium metal secondary battery, a lithium ion secondary battery, a lithium polymer secondary battery, or a lithium ion polymer secondary battery.

The electrode applicable to the electrochemical element according to an exemplary embodiment is not strictly limited to a certain example, and may be fabricated in a form in which the electrode active material is bound to an electrode current collector according to a method known in the art.

Non-limiting examples of a cathode active material among the electrode active materials may include a general cathode active material that may be used in the cathode of the related electrochemical element, and may specifically include lithium manganese oxides, lithium cobalt oxides, lithium nickel oxides, lithium iron oxides or lithium composite oxides combining these, for example. Non-limiting examples of an anode active material may include a general anode active material that may be used in the anode of the related electrochemical element, and may preferably include lithium adsorbing materials such as lithium metal or lithium alloy, carbon, petroleum coke, activated carbon, graphite or other carbons, for example. Non-limiting examples of a cathode current collector may include a foil prepared from aluminum, nickel, or a combination thereof, and non-limiting examples of an anode current collector may include a foil prepared from copper, gold, nickel, copper alloy or a combination thereof.

The electrolyte salt contained in the non-aqueous electrolyte that may be used in an exemplary embodiment is a lithium salt. The lithium salt generally used in the electrolyte for the lithium secondary battery may be used without limitations. For example, the negative ion of the lithium salt may be any one selected from a group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Any organic solvent generally used in electrolyte of the lithium secondary battery may be used in the non-aqueous electrolyte described above without limitations. For example, ether, ester, amide, linear carbonate, cyclic carbonate and so on may be used either individually or as a mixture of two or more.

A representative example may include cyclic carbonate, linear carbonate, or carbonate compound which is a mixture of these.

A specific example of the cyclic carbonate compound may include any one selected from a group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halide thereof, or a mixture of two or more thereof.

The halides may include, for example, fluoroethlyene carbonate (FEC) and so on, but not limited thereto.

Further, a specific example of the linear carbonate compound may include any one selected from a group consisting of dimethyl carbonate (DMC), diethyl carbonate (DEC), dipropyl carbonate (DPC), ethyl methyl carbonate (EMC), methyl propyl carbonate and ethyl propyl carbonate, or a mixture of two or more thereof, but not limited thereto.

Specifically, ethylene carbonate and propylene carbonate which are cyclic carbonates of the carbonate-based organic solvents high-viscosity organic solvent which can better dissociate lithium salt in the electrolyte due to high dielectric constant thereof. By mixing such cyclic carbonate with low-viscosity, low-dielectric linear carbonate such as dimethyl carbonate and diethyl carbonate at a proper ratio, an electrolyte having higher electric conductivity can be obtained.

Among the organic solvents, ether may include any one selected from a group consisting of dimethyl ether, diethyl ether, dipropyl ether, methylethyl ether, methylpropyl ether and ethylpropyl ether, or a mixture of two or more thereof, but not limited thereto.

Among the organic solvents, ester may include any one selected from a group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof, but not limited thereto. Injection of the non-aqueous electrolyte may be performed at a proper stage in the manufacturing process of the electrochemical element depending on the manufacturing process and properties required for a finished product. That is, the injection stage may be applied prior to the assembly of the electrochemical element or at a final stage of the assembly of the electrochemical element.

The electrochemical element according to the present disclosure can be manufactured through lamination, stacking, and folding of the separator and the electrode, as well as general process such as winding.

Further, appearance of the electrochemical element may not be specifically limited, but may include cylindrical-type using can, rectangular-type, pouch-type, or coin-type.

BEST MODE

Hereinafter, for more specific description, the present disclosure will be described in detail with reference to Examples. However, the Examples according to the present disclosure can be modified in various forms, and the scope of the present disclosure is not to be construed as being limited to the Examples described below. The Examples according to the present disclosure are provided in order to give more complete description of the present disclosure to those having average knowledge in the art.

EXAMPLE 1

Preparation of Separator

To a mixture of 100 parts by weight of acetone as solvent and 30 parts by weight of methanol as non-solvent, 3 parts by weight of polyvinylidene fluoride (LBG, Arkema Inc., HFP amount 5%) which is the first polymer binder, and 0.3 parts by weight of polyvinylidene fluoride (Kynar2500, Arkema Inc., HFP amount 20%), were added, and after dissolving at 50 □ for about 12 hours, the binder polymer solution was prepared. To 80 parts by weight of the solution described above was added 20 parts by weight of 500 nm grade alumina (AES11, Sumitomo Chemical Co., Ltd.), and the slurry for formation of the porous coating layer was prepared. The slurry was coated on both surfaces of a 7 µm-thick polyethylene porous film (ND307B, Asahi) with dip coating to form into the porous coating layer, and the separator was prepared. A thickness of the porous coating layer was adjusted to about 4 µm.

COMPARATIVE EXAMPLE 1

Preparation of Separator

The separator was prepared with the same method as Example 1 except for using 3.3 parts by weight of polyvinylidene fluoride (LBG, Arkema Inc., HFP content 5%) alone as binder polymer.

COMPARATIVE EXAMPLE 2

Preparation of Separator

The separator was prepared with the same method as Example 1 except for using 1.0 part by weight of acrylic-based copolymer which is a particulate dispersion emulsion binder polymer (CSB130, Toyo ink) as a binder polymer and using water as a solvent.

EVALUATION EXAMPLE

Tape (3M transparent tape) was attached onto the porous coating layers of the separators prepared in Example 1 and Comparative Examples 1 and 2, respectively, and then the porous coating layers were separated from the separators by removing the tape. The separators from which the coating layers were removed were held on ATR, and 50 uL of propylene carbonate solvent was drop-wisely added from an upper portion of one surface of the separators. Propylene carbonate was permeated in a thickness direction of the separators toward a side opposite to the side where the solvent was drop-wisely added, and the magnitude of C=O peak on the ATR was observed over time so that time taken until the magnitude of the peak reached a critical point was measured, and the result was recorded as indicated in Table 1 below.

TABLE 1

| | Example 1 | Comparative example 1 | Comparative example 2 |
|---|---|---|---|
| Duration(sec) | 1.05 | 6.05 | 12.30 |

What is claimed is:

1. A separator for an electrochemical element, comprising:
a porous polymer substrate having a plurality of pores; and
a layer formed on at least one surface of the porous polymer substrate, where the layer formed from a binder polymer solution containing a first binder polymer and a second binder polymer, a solvent, and a non-solvent,
wherein, the first binder polymer has a slope of a frequency-storage modulus curve of greater than 0 and no more than 1.0 within a frequency range of 0.01 rad/s to 10 rad/s when measured in a first binder polymer solution having 3 wt % of the first binder polymer and 30 wt % methanol as a non-solvent,
wherein the second binder polymer has a slope of the frequency-storage modulus curve that is greater than 1.0 and no more than 2.0 within the frequency range of 0.01 rad/s to 10 rad/s when measured in a second binder polymer solution having 3 wt % of the second binder polymer and 30 wt % of methanol as a non-solvent, and
wherein the frequency-storage modulus curve having a horizontal axis representing the frequency (rad/s) converted into a log scale and a vertical axis representing a storage modulus (MPa) converted into a log scale.

2. The separator of claim 1, wherein the first binder polymer and the second binder polymer are used in a weight ratio of 20:1 to 2:1.

3. The separator of claim 1, wherein the first binder polymer is polyvinylidene fluoride (PVDF), PVdF-HFP having 9% or lower HFP substitution ratio, or a mixture thereof, and the second binder polymer is PVdF-HFP having 12% or greater HFP substitution ratio, PVdF-CTFE, polyvinylacetate, cyanoethyl pullulan, cyanoethyl polyvinylalcohol, or a mixture thereof.

4. The separator of claim 1, wherein the layer comprising the first binder polymer and the second binder polymer further comprises inorganic particles.

5. The separator of claim 1, wherein the inorganic particles comprise inorganic particles having a dielectric constant of about 5 or higher, inorganic particles having a lithium ion transfer ability, or a mixture thereof.

6. The separator of claim 5, wherein the inorganic particles having the dielectric constant of about 5 or higher are any one selected from a group consisting of boehmite, $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)PB(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC, or a mixture of two or more thereof.

7. The separator of claim 5, wherein the inorganic particle having a lithium ion transfer ability are any one selected from the group consisting of lithium phosphate($Li_3PO_4$), lithium titanium phosphate($Li_xTi_y(PO_4)_3$, $0<x<2$, $0<y<3$), lithium aluminum titanium phosphate($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthan titanate ($Li_xLa_yTiO_3$, $0<x<2$, $0<y<3$), lithium germanium thio phosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$) or a mixture of two or more thereof.

8. A method for manufacturing the separator for an electrochemical element as set forth in claim 1, the method comprising:
preparing a porous polymer substrate having a plurality of pores;
preparing a binder polymer solution containing a first binder polymer, a second binder polymer, a solvent to dissolve both of the binder polymers, and a non-solvent to dissolve none of the binder polymers; and
coating the binder polymer solution on at least one surface of the porous polymer substrate, and phase-separating under a humidity condition.

9. The separator of claim 8, wherein the solvent is any one selected from a group consisting of acetone, dimethyl acetamide (DMAc), dimethylformamide (DMF), tetrahydrofuran, methylene chloride (MC), chloroform, N-methyl-2-pyrrolidone (NMP) and cyclohexane, or a mixture of two or more thereof.

10. The separator of claim 8, wherein the non-solvent is any one selected from a group consisting of methanol, ethanol, isopropyl alcohol, butanol, ethyl acetate and water, or a mixture of two or more thereof, but not limited thereto.

11. The separator of claim 8, wherein a weight ratio of the solvent and the non-solvent is 98:2 to 50:50.

12. The separator of claim 8, wherein the humidity condition comprises a relative humidity condition of 40% to 80% at a temperature of 25° C. to 80° C.

* * * * *